(12) United States Patent
Nelson et al.

(10) Patent No.: US 10,693,683 B1
(45) Date of Patent: Jun. 23, 2020

(54) SYSTEMS AND METHODS FOR RESILIENT HF LINKING

(71) Applicant: Rockwell Collins, Inc., Cedar Rapids, IA (US)

(72) Inventors: Randy W. Nelson, Anamosa, IA (US); Weylin R. MacCalla, Cedar Rapids, IA (US); Joseph A. Lahart, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/519,595

(22) Filed: Jul. 23, 2019

(51) Int. Cl.
*H04L 25/02* (2006.01)
*H04B 17/382* (2015.01)
*H04B 17/318* (2015.01)
*H04W 76/12* (2018.01)

(52) U.S. Cl.
CPC ....... *H04L 25/0238* (2013.01); *H04B 17/318* (2015.01); *H04B 17/382* (2015.01); *H04W 76/12* (2018.02)

(58) Field of Classification Search
CPC . H04L 25/0238; H04B 17/318; H04B 17/382; H04W 76/12
See application file for complete search history.

(56) References Cited

U.S. PATENT DOCUMENTS

2011/0317455 A1* 12/2011 Azuma ................ H02M 7/48
363/37

* cited by examiner

Primary Examiner — Kabir A Timory
(74) Attorney, Agent, or Firm — Donna P. Suchy

(57) ABSTRACT

A resilient HF linking approach can include an HF transmitting device sending an HF connection request to an HF receiving device over an HF channel. Upon receiving an acknowledgement of the request, the HF transmitting device can transmit a predefined data load to the HF receiving device. The predefined data load can be known to the HF receiving device. The HF receiving device can use the predefined data load to estimate one or more parameters of the HF channel, and send estimates of the parameter(s) back to the transmitting device. The transmitting device can use the estimates of the one or more parameters to determine a data rate for use to transmit data to the receiving device aver the HF channel. The HF channel can be a wideband HF channel. The resilient HF linking approach allows of improvement of the performance and resilience of established HF links.

20 Claims, 5 Drawing Sheets

SYSTEMS AND METHODS FOR RESILIENT HF LINKING

BACKGROUND

The inventive concepts disclosed herein relate generally to the field of high frequency (HF) communication systems. More particularly, embodiments of the inventive concepts disclosed herein relate to systems and methods for resilient HF linking.

HF communication provides a low cost approach for communicating over long distances, e.g., beyond the horizon. HF communication systems operate at frequency bands between 2 megahertz (MHz) and 30 MHz. Within this frequency range, propagating HF radio waves can bounce off ionospheric layers, land or sea allowing for long distance (or beyond the horizon) communication. Specifically, HF radio waves can travel long distances (e.g., beyond line of sight) while bouncing back and forth between the ionospheric layers and land (or sea). Compared to, for example, satellite communication, HF communication is significantly less costly.

A drawback associated with HF communication is that HF channels (or HF radio links) are typically time varying, unpredictable, and prone to fading and noise. In particular, HF ionospheric propagation conditions can change significantly over time resulting in time-varying characteristics (e.g., impulse response, center frequency, background noise, etc.) of HF channels. For instance, the structure of the ionospheric layers changes between day time and night time. Also, weather conditions (e.g., sun, rain, storms, lightning) can affect ionospheric absorption (or signal attenuation) and/or background noise. The time varying nature of ionospheric propagation conditions can impose limitations on the use of HF communication.

SUMMARY

In one aspect, the inventive concepts disclosed herein are directed to a high frequency (HF) communication device. The HF communication device can include a processor and a memory communicably coupled to the processor and storing computer code instructions. The computer code instructions, when executed by the processor, can cause the HF communication device to send an HF connection request to a second HF communication device. The HF communication device can receive, responsive to transmitting the HF connection request, a first data unit from the second HF communication device confirming receipt of the HF connection request by the second HF communication device. The HF communication device can transmit, responsive to receiving the first data unit, a predefined data load to the second HF communication device for use to estimate one or more parameters of a first wideband HF communication channel. The first wideband HF communication channel can be for transmitting data from the HF communication device to the second HF communication device. The predefined data load can be known to the second HF communication device. The HF communication device can receive, from the second HF communication device and responsive to transmitting the predefined data load, a second data unit including one or more estimates of the one or more parameters of the first wideband HF communication channel. The HF communication device can transmit data to the second HF communication device over the first wideband HF communication channel according to a data rate defined based on the one or more estimates of the one or more parameters of the first wideband HF communication channel.

The HF communication device can transmit the predefined data load over a time period 15 to 60 seconds long. The one or more parameters can include at least one of a signal-to-noise ratio (SNR) or a bit error rate (BER) of the first HF communication channel. The first wideband HF channel can have a bandwidth of up to 48 KHz. The HF communication device can send, responsive to the second data unit, a message to the second HF communication device to confirm receipt of the second data unit. The HF communication device can send a message to the second HF communication device to confirm establishing a wideband HF connection for transmitting data from the HF communication device to the second HF communication device.

The HF communication device can receive a second predefined data load from the second HF communication device for use to estimate one or more parameters of a second wideband HF communication channel. The second wideband HF communication channel can be for transmitting data from the second HF communication device to the HF communication device. The second predefined data load can be known to the HF communication device. The HF communication device can determine, based on the second predefined data load, one or more estimates of one or more second parameters of the second wideband HF communication channel. The HF communication device can transmit, to the second HF communication device, a third data unit including the one or more estimates of the one or more second parameters of the second wideband HF communication channel.

The second predefined data load can be received over a time period 15 to 60 seconds long. The one or more second parameters can include at least one of a signal-to-noise ratio (SNR) or a bit error rate (BER) of the second HF communication channel. The second wideband HF channel can have a bandwidth of up to 48 KHz. The HF communication device can receive a message from the second HF communication device to confirm establishing a wideband HF connection for transmitting data from the second HF communication device to the HF communication device.

In one aspect, the inventive concepts disclosed herein are directed to a method for establishing wideband HF connections. The method can include a first HF communication device sending an HF connection request to a second HF communication device. The method can include the first HF communication device receiving, responsive to transmitting the HF connection request, a first data unit from the second HF communication device confirming receipt of the HF connection request by the second HF communication device. The method can include the first HF communication device transmitting, responsive to receiving the first data unit, a predefined data load to the second HF communication device for use to estimate one or more parameters of a first wideband HF communication channel. The first wideband HF communication channel can be for transmitting data from the HF communication device to the second HF communication device. The predefined data load can be known to the second HF communication device. The method can include the first HF communication device receiving, from the second HF communication device and responsive to transmitting the predefined data load, a second data unit including one or more estimates of the one or more parameters of the first wideband HF communication channel. The method can include the first HF communication device establishing a first wideband connection with the second HF connection device to transmit data to the second HF communication device over the first wideband HF communication channel according to a data rate defined based on the one or more estimates of the one or more parameters of the first wideband HF communication channel.

In some embodiments, transmitting the predefined data load can include transmitting the predefined data load over a time period 15 to 60 seconds long. The one or more parameters can include at least one of a signal-to-noise ratio (SNR) or a bit error rate (BER) of the first HF communication channel. The first wideband HF channel can have a bandwidth of up to 48 KHz. The method can further include the first HF communication device sending, responsive to the second data unit, a message to the second HF communication device to confirm receipt of the second data unit. The method can further include the first HF communication device sending a message to the second HF communication device to confirm establishing a wideband HF connection for transmitting data from the HF communication device to the second HF communication device.

In some embodiments, the method can further include the first HF communication device receiving a second predefined data load from the second HF communication device for use to estimate one or more parameters of a second wideband HF communication channel. The second wideband HF communication channel can be for transmitting data from the second HF communication device to the HF communication device. The second predefined data load can be known to the HF communication device. The method can include the first HF communication device determining, based on the second predefined data load, one or more estimates of one or more second parameters of the second wideband HF communication channel, and transmitting to the second HF communication device a third data unit including the one or more estimates of the one or more second parameters of the second wideband HF communication channel.

In some embodiments, receiving the second predefined data load can include receiving the second predefined data load over a time period 15 to 60 seconds long. The one or more second parameters can include at least one of a signal-to-noise ratio (SNR) or a bit error rate (BER) of the second HF communication channel. The method can further include the first HF communication device receiving a message from the second HF communication device to confirm establishing a wideband HF connection for transmitting data from the second HF communication device to the first HF communication device.

Another aspect of the inventive concepts disclosed herein are directed to a non-transitory computer-readable medium having computer code instructions stored thereon. The computer code instructions, when executed by a processor, can cause a first HF communication device to send an HF connection request to a second HF communication device, and receive, responsive to transmitting the HF connection request, a first data unit from the second HF communication device confirming receipt of the HF connection request by the second HF communication device. The computer code instructions, when executed by the processor, can cause the first HF communication device to transmit, responsive to receiving the first data unit, a predefined data load to the second HF communication device for use to estimate one or more parameters of a first wideband HF communication channel. The first wideband HF communication channel can be for transmitting data from the HF communication device to the second HF communication device. The predefined data load can be known to the second HF communication device. The computer code instructions, when executed by the processor, can cause the first HF communication device to receive, from the second HF communication device and responsive to transmitting the predefined data load, a second data unit including one or more estimates of the one or more parameters of the first wideband HF communication channel, and establish a first wideband connection with the second HF connection device to transmit data to the second HF communication device over the first wideband HF communication channel according to a data rate defined based on the one or more estimates of the one or more parameters of the first wideband HF communication channel.

The computer code instructions, when executed by the processor, can cause the first HF communication device to transmit the predefined data load over a time period 15 to 60 seconds long. The one or more parameters can include at least one of a signal-to-noise ratio (SNR) or a bit error rate (BER) of the first HF communication channel. The first wideband HF channel can have a bandwidth of up to 48 KHz. The computer code instructions, when executed by the processor, can further cause the first HF communication device to send, responsive to the second data unit, a message to the second HF communication device to confirm receipt of the second data unit. The computer code instructions, when executed by the processor, can cause the first HF communication device to send a message to the second HF communication device to confirm establishing a wideband HF connection for transmitting data from the HF communication device to the second HF communication device.

The computer code instructions, when executed by the processor, can further cause the first HF communication device to receive a second predefined data load from the second HF communication device for use to estimate one or more parameters of a second wideband HF communication channel. The second wideband HF communication channel can be for transmitting data from the second HF communication device to the HF communication device. The second predefined data load can be known to the HF communication device. The computer code instructions, when executed by the processor, can further cause the first HF communication device to determine, based on the second predefined data load, one or more estimates of one or more second parameters of the second wideband HF communication channel. The computer code instructions, when executed by the processor, can further cause the first HF communication device to transmit, to the second HF communication device, a third data unit including the one or more estimates of the one or more second parameters of the second wideband HF communication channel.

The second predefined data load can be received over a time period 15 to 60 seconds long. The one or more second parameters can include at least one of a signal-to-noise ratio (SNR) or a bit error rate (BER) of the second HF communication channel. The second wideband HF channel can have a bandwidth of up to 48 KHz. The computer code instructions, when executed by the processor, can further cause the first HF communication device to receive a message from the second HF communication device to confirm establishing a wideband HF connection for transmitting data from the second HF communication device to the HF communication device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
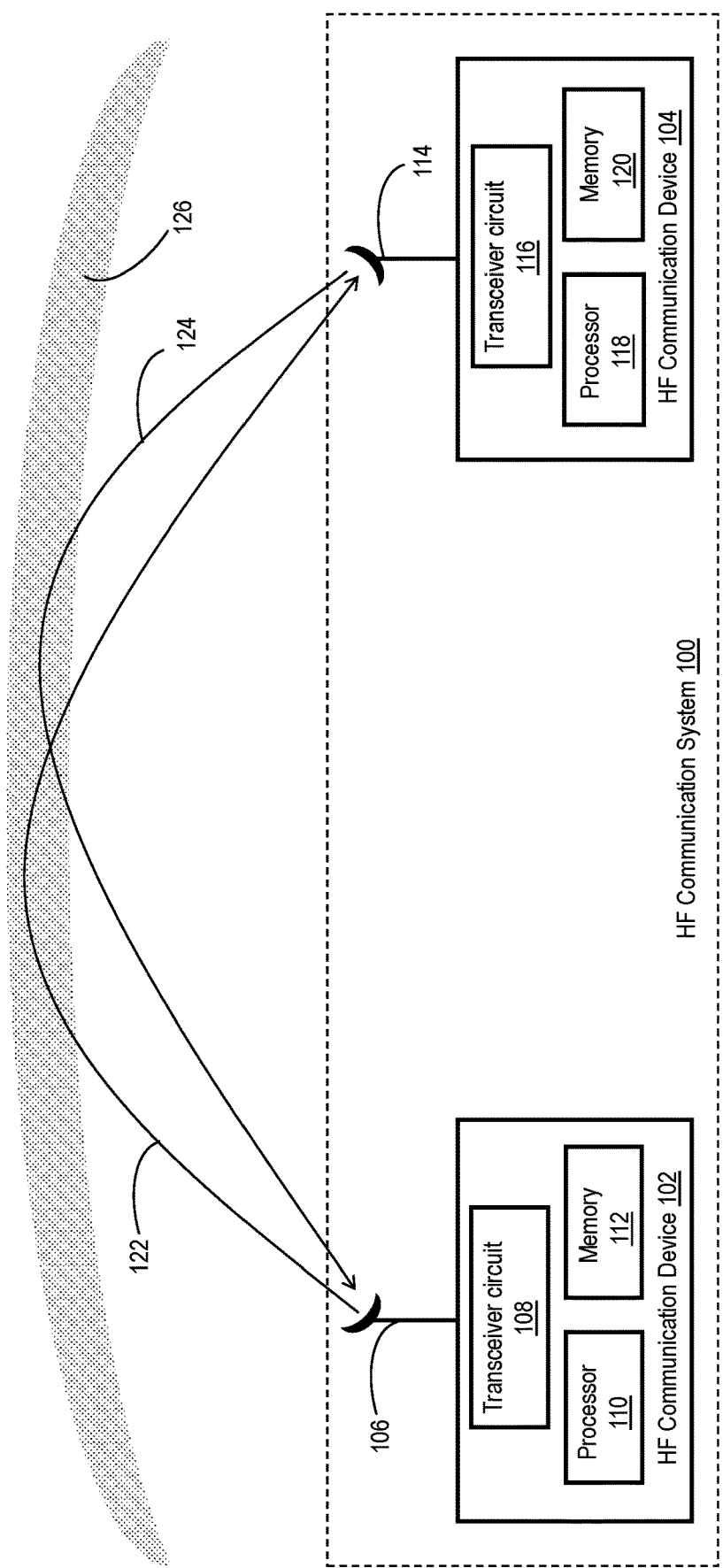
FIG. 1 is a diagram of a high frequency (HF) communication system, according to some inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1$a$, 1$b$). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

HF communication channels are typically unpredictable, time varying, and prone to noise and fading, among other drawbacks. These drawbacks impose restrictions on the use of HF communication systems. For instance, established HF radio connections can fail or degrade, e.g., in terms of bit error rate (BER), signal-to-noise ratio (SNR), or other parameters indicative of the radio connection quality, relatively fast compared to other types of radio connections. As such, data transmission over HF communication systems is usually limited to transmission of relatively short bursts of data.

One approach to improve the resilience of HF communication systems is to improve or modify the HF linking protocols employed. The commonly used standard for initiating and maintaining HF radio communications is the automatic linking establishment (ALE) standard. Current HF automatic linking establishment (ALE) protocols use a three-way handshake similar to that used in transport control protocol (TCP) connections, and select a "seed data rate" for data payload transfers. The initial data rate selection is based upon small probe durations for analyzing channel quality. In other words, current ALE protocols value speed of linking over reliability of data transfer. As such, the established HF links usually work well for voice communications and relatively short bursts of data, but are not resilient enough for data streaming or for transmission of relatively large data files (or data loads). The lack of resiliency leads to a large BER, and, in the case of transmission of a large data file, causes the retransmission of a significant portion of the data file. Simulation results conducted using the current ALE protocols show retransmission, due to degradation of the established HF communication link, of about 40% of the data file. Simulation results for data streams indicate an even worse performance, as the receiving device has no opportunity to inform the transmitting device when synchronization is lost or whether the received data has an unacceptable BER.

Systems, devices and methods of the current disclosure employ a resilient HF linking approach. The new HF linking approach can be viewed as an improvement to HF linking protocols in general and to ALE protocols in particular. The new HF linking approach allows for a more accurate assessment of the linking environment with the cost of a longer linking period or slower linking speed (e.g., compared to existing ALE protocols). Specifically, new HF linking processes described herein include the transmission of a predefined data load from a transmitting device for use by a receiving device to assess the current characteristics of the HF channel. The predefined data load can be known to the receiving device, and long enough to allow for accurate and reliable assessment of the characteristics (e.g., BER, SNR, and/or channel impulse response, among others) of the HF channel. The receiving device can use the received signals(s) corresponding to the predefined data load to estimate one or more parameters of the HF channels, and send the estimated parameter(s) to the transmitting device for use to determine the data rate to be used when transmitting data to the receiving device.

The new HF linking techniques or processes can be used or implemented with other HF linking protocols allowing HF communication devices to switch between different HF linking processes depending, for example, on the type of application or type of communication involved. For instance, the HF linking processes described in this disclosure can be implemented with existing ALE linking protocols. HF communication devices may, for example, employ the new HF linking processes in applications that involve data streaming or transfer of relatively large data files, and use existing ALE protocols in voice communications. In some implementations, the new resilient HF linking processes can be employed for data and voice communications.

Referring now to FIG. 1, a diagram of a high frequency (HF) communication system 100 is shown, according to some inventive concepts disclosed herein. The HF communication system 100 can include a first HF communication device 102 and second HF communication device 104. Each of the first and second HF communication devices 102 and 104 can act as a transmitting device, a receiving device or a transceiver (transmitting and receiving). The first HF communication device 102 can include an antenna 106 for transmitting and/or receiving HF radio signals or waves. The first HF communication device 102 can include a plurality of antennas, such as a separate transmitting antenna and a separate receiving antenna. The first HF communication device 102 can include a transceiver circuit 108, one or more processors (or processing circuits) 110 and a memory 112. The transceiver circuit 108 can perform, for example, signal modulation, signal demodulation, signal interleaving, signal de-interleaving, filtering, other signal processing or a combination thereof. The transceiver circuit 108 can include a separate receiver circuit and a separate transmitter circuit.

The one or more processors (or processing circuitries) 110 can execute HF linking methods or processes as described in further detail below with respect to FIGS. 2-4. The processor(s) 110 can include a microprocessor, a digital signal processor, an application specific integrated circuit (ASIC), or a combination thereof. The memory 112 can store computer code instructions that are executed by the one or more processors 110. For instance, the resilient HF linking methods or processes described herein (e.g., with regard to FIGS. 2-4 below) can be fully or partially implemented as computer code instructions that can be stored in the memory 112 and executed by the one or more processors 110. The memory 112 can store data (or signal samples) received or to be transmitted by the first HF communication device 102.

Similar to the first HF communication device 102, the second HF communication device 104 can include an antenna 114, a transceiver circuit 116, one or more processors (or processing circuits) 118, and a memory 120. The antenna 114 can transmit or receive HF radio signals. The second HF communication device 104 can include a plurality of antennas, e.g., a separate receiving antenna and a separate transmitting antenna. The transceiver circuit 116 can perform, for example, signal modulation, signal demodulation, signal interleaving, signal de-interleaving, filtering, other signal processing, or a combination thereof. The one or more processors 118 can perform resilient HF linking methods described below with regard to FIGS. 2-4, other HF linking methods, or a combination thereof. The memory 120 can store computer code instructions associated with the resilient HF linking methods described below with regard to FIGS. 2-4. The computer code instructions can be executed by the one or more processors 118.

The first HF communication device 102 can transmit HF radio signals 122 to the second HF communication device 104 over a first HF communication channel, while the second HF communication device 104 can transmit HF radio signals 124 to the first HF communication device 102 over a second HF communication channel. The first and second HF channels can have the same frequency band (e.g., they correspond to opposite transmission paths of a single bi-directional HF channel), or can have distinct frequency bands (e.g., in the case of a split site system). The HF Radio signals 122 usually bounce off the ionosphere (or ionospheric layers) 126 before being received by the antenna 114 or the second HF communication device 104. Similarly, the HF Radio signals 124 usually bounce off the ionosphere (or ionospheric layers) 126 before being received by the antenna 106 or the first HF communication device 102. The HF radio signals 122 and 124 can propagate over distinct paths and can bounce off different regions of the ionosphere 126. As such, the first and second HF communication channels can have different characteristics (e.g., with respect to BER, SNR, fading, frequency response, among others) even when both channels share the same frequency band or sub-band. Any of the first and second HF communication devices 102 and 104 when acting as a transmitter, or both when acting as transceivers, can trigger an HF linking process to estimate or determine the characteristics of a respective HF communication channel and use the HF channel characteristics to determine the data rate to be used when transmitting over the respective HF communication channel.

Figure 2:
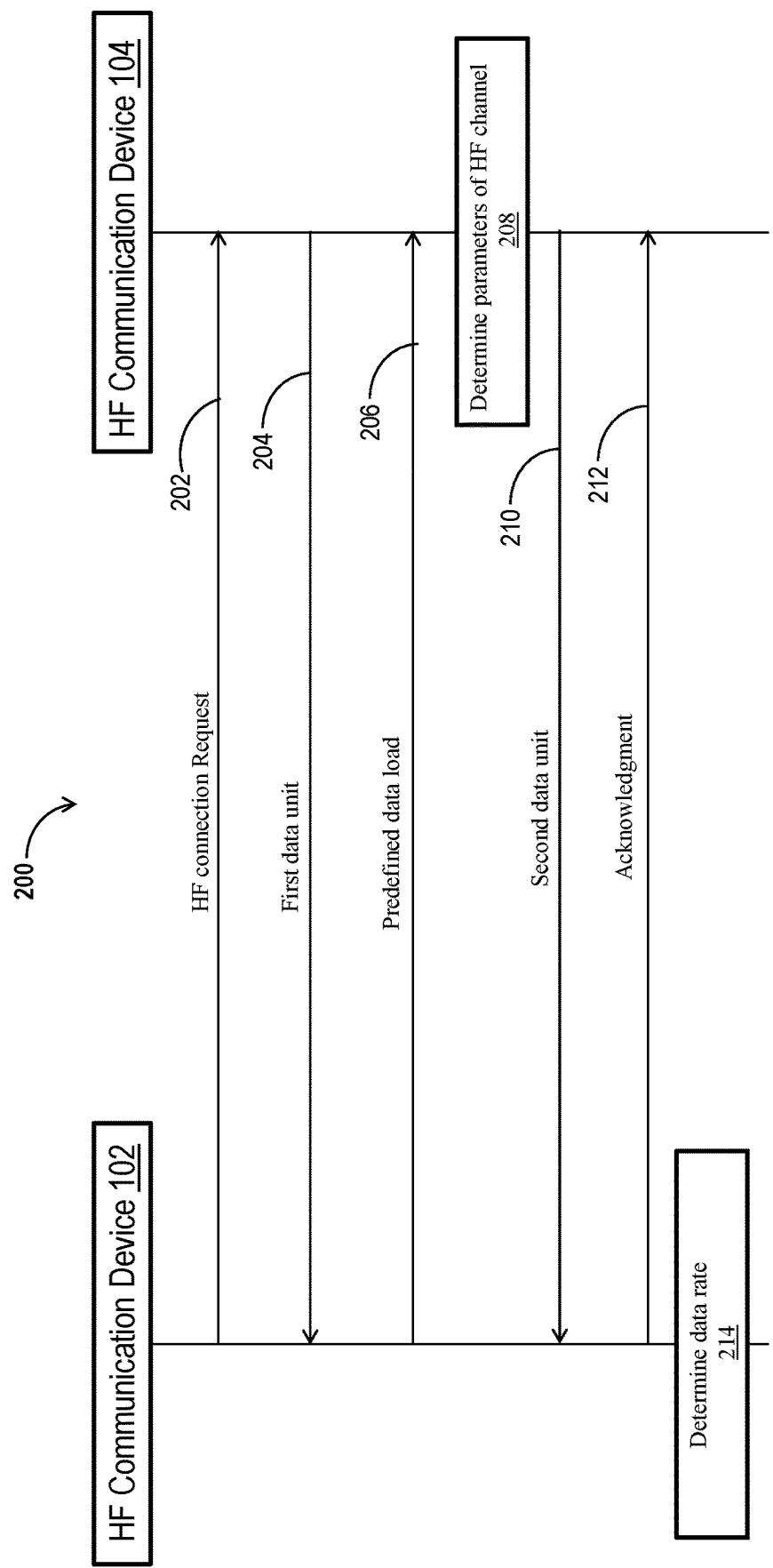
FIG. 2 is a signaling flow diagram illustrating a resilient HF linking method performed by the HF communication system of FIG. 1, according to some inventive concepts disclosed herein.
Figure 2:
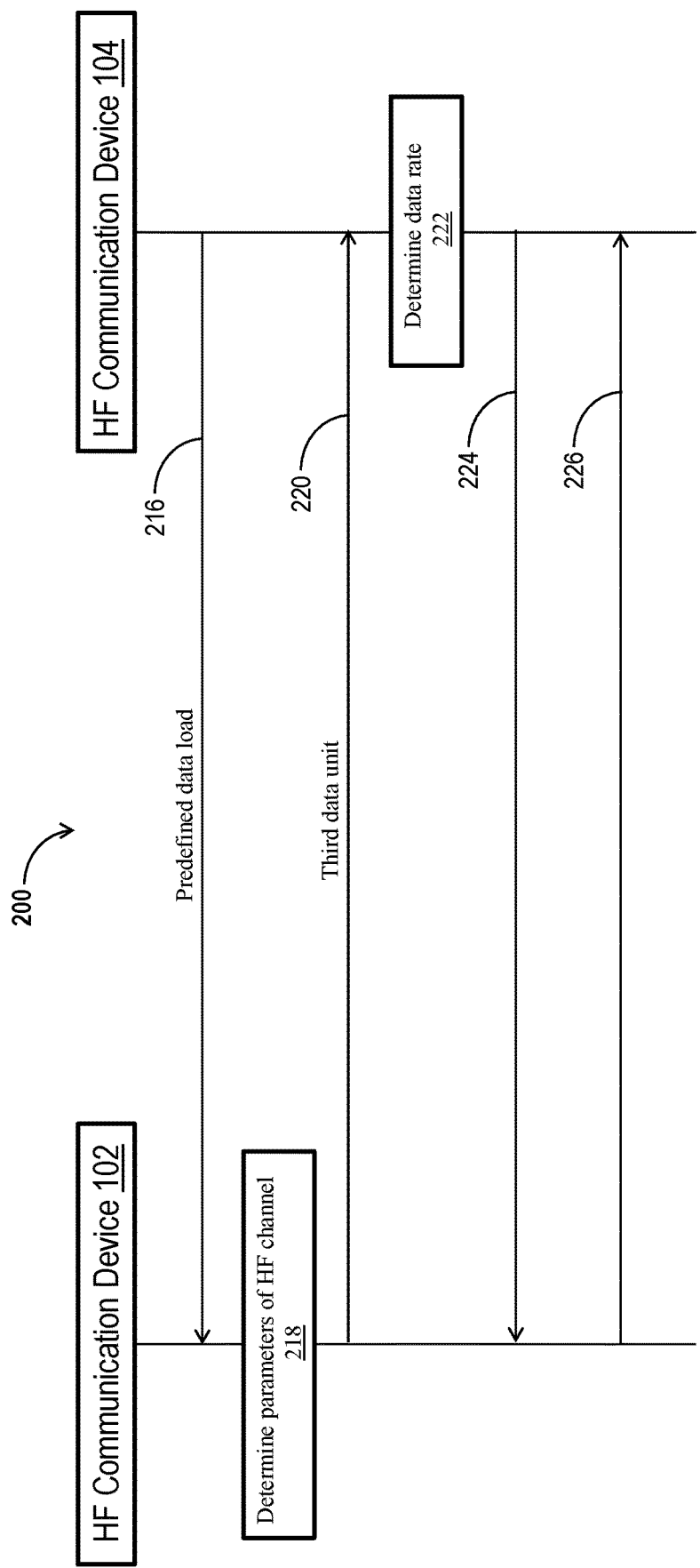

Referring now to FIG. 2, a signaling flow diagram illustrating a resilient HF linking method 200 performed by the HF communication system 100 of FIG. 1 is shown, according to some inventive concepts disclosed herein. The method 200 can include the first HF communication device 102 sending an HF connection request to the second HF communication device 104 (step 202). The first HF communication device 102 (or respective transceiver circuit 108 or processor(s) 110) can select an idle HF channel from a plurality of HF channels supported by the HF communication system 100, and transmit the HF connection request over the selected HF channel. Each of the plurality HF channels can have a respective bandwidth and center frequency. The plurality of HF channels can include wideband HF channels having a bandwidth, for example, between 3 KHz and 48 KHz. The plurality of HF channels can also include narrowband HF channels having a bandwidth, for example, less than or equal to 3 KHz. In some implementations, the bandwidth of the wideband HF channels can be greater than 48 KHz. The transceiver circuit 108 or processor(s) 110 can select an idle wideband HF channel.

The HF connection request can be, or can include, an ALE connect request. The HF connection request can identify the transmitting device and/or the destination device. For instance, the HF connection request can include an address, or identifier (ID), of the first HF communication device 102, and an address or ID of the second HF communication device 104. Each HF communication device, e.g., device 102 or 104, when is not actively in communication with another device can repeatedly scan the plurality of HF channels for any potential requests or calls. When the HF communication device receives a connection request, as is the case for the second HF communication device 104, it can stay tuned to the HF channel on which it received the connection request and stop scanning other channels until the HF communication device determines whether it is the intended destination of the received HF connection request.

The method 200 can include the second HF communication device 104 transmitting, responsive to receiving the HF connection request, a first data unit from to the first HF communication device 102 confirming receipt of the HF connection request by the second HF communication device (step 204). Upon receiving the HF connection request, the second HF communication device 104 can demodulate and/or decode the received HF connection request and extract the destination address and/or the address of the transmitting device (e.g., the address of the first HF communication device 102) from the request. Upon determining that the extracted destination address is equal to its own address, the second HF communication device 104 (or the respective processor(s) 118 or transceiver circuit 116) can send the first data unit to the first HF communication device 102. The first data unit can be, or can include, a results protocol data unit (PDU). The first data unit can be indicative, to the first HF communication device 102, of receipt of the HF connection request by the second HF communication device 104. The first data unit can be viewed as a dummy PDU that is used mainly as an acknowledgement of receipt of the HF connection request by the second HF communication device 104. The first data unit may or may not include primitive estimates of channel characteristics (e.g., BER and/or SNR estimates determined based on the received connection request). Such primitive estimates if included do not guarantee reliable connection for data streaming or for transmission of relatively large data files (or data loads).

The method 200 can include the first HF communication device sending, responsive to receipt of the first data unit, a predefined data load to the second HF communication device (step 206). The predefined data load can be known to both the first and second HF communication devices 102 and 104. In general, the predefined data load can be known to all, or a plurality of, HF communication devices implementing resilient HF linking processes described herein. In some implementations, each HF communication device can store a copy of the predefined data load. For instance, the second HF communication device 104 can store, e.g., in memory 120, a non-modulated version and/or a modulated version of the predefined data load. The non-modulated version of the predefined data load can include a sequence of data bits, while the modulated version of can be a signal representing (or formed of) a sequence of data symbols corresponding to the sequence of data bits. The predefined data load can be for use by the receiving device (e.g., the second HF communication device 104) to estimate one or more parameters of the wideband HF communication channel selected by the first HF communication device 102 at step 202. The wideband HF communication channel can be used to transmit data from the first HF communication device 102 to the second HF communication device 104.

The second HF communication device 104 can determine or estimate, using the received predefined data load, one or more parameters of the wideband HF communication channel (step 208). For example, the second HF communication device 104 can use the received version of the predefined data load and at least one of the modulated or non-modulated versions of the predefined data load maintained in memory 120 to determine the SNR and/or the BER associated with the received version of the predefined data load. In some implementations, SNR can be determined at baseband level while the BER can be determined after demodulation. The SNR can be calculated an interleaver length sooner than the BER. The predefined data load can be transmitted by the first HF communication device (or received by the second HF communication device 104) over a configurable time period ranging, for example between 15 and 60 seconds. The predefined data load can be long enough to allow for accurate assessment of the characteristics or attributes (e.g., SNR and/or BER) of the wideband HF channel over which the predefined data load was transmitted. For example, the predefined data load can be designed to fill out (e.g., in terms of transmission) the configurable (or selected) time period. Modeling the noise or SNR associated with the wideband HF channel as a random variable (or stochastic process), a sufficiently large number of data samples or bits (e.g., one or more Kbits) of the predefined data load would allow accurate measurement or assessment of the statistical parameters (e.g., mean, variance, standard deviation, etc.) of the noise, SNR or BER. The configurable time period of transmission, or reception, of the predefined data load can be viewed as a BER or SNR test period.

In some implementations, the second HF communication device 104 can compute, or determine, a plurality of SNR values and/or BER values using the received predefined data load. For example, the predefined data load can include a plurality of data chunks or sequences, and the second HF communication device 104 or the respective processor(s) 118 can compute a separate SNR value and/or a separate BER value for each data chunk or sequence. The processor(s) 118 can perform a statistical analysis on the computed SNR and/or BER values. For instance, the processor(s) 118 can compute the mean, variance and/or standard deviation for the computed SNR values and/or the computed BER values. The processor(s) 118 can use the received predefined data load, or chunks thereof, to determine other parameters or attributes of the wideband HF channel. For example, the processor(s) can use the received data load to estimate or determine a finite impulse response (FIR) of the wideband HF channel. In some implementations, the processor can determine or estimate the time delay between the transmission at the first HF communication device 102 and reception at the second HF communication device 104. For example, each data chuck or sequence of the predefined data load can include a time stamp indicative of the time of transmission of that data chunk or sequence. The processor(s) 118 can use the time stamps to determine the transmission times of the data chunks or sequences. The processor(s) can perform a statistical analysis on (e.g., compute mean, variance, or standard deviation, etc., of) the transmission times for various data chunks or sequences to determine an estimate of the transmission time between the first and second HF communication devices 102 and 104 over the wideband HF channel. The processor(s) 118 can determine other attributes or parameters, e.g., type of noise (white or colored), of the wideband HF channel using the received predefined data load.

The processor(s) 118 can determine or select, based on the statistical analysis, a SNR value and/or a BER value for sending to the first HF communication device 102. For example, the processor(s) 118 can determine the SNR of the wideband HF channel to be equal to the mean of the SNR values minus twice (or other multiple of) the standard deviation of the SNR values. This transformation (or operation) reflects a correlation between the pre-link SNR and the post link SNR determined based on experimental results that show that the best BER performance of the link is achieved when using a SNR estimate that is equal the mean of the SNR values minus twice (or other multiple of) the standard deviation of the SNR values. The processor(s) 118 can determine the BER of the wideband HF channel based on the determined SNR estimate as discussed in further detail below. A person skilled in the art would appreciate that other processing (or operations) may be used to determine a final SNR and/or final BER values based on measured values.

The method 200 can include the second HF communication device 104 transmitting, responsive to the predefined data load, (and the first HF communication device 102 receiving) a second data unit including one or more estimates of the one or more parameters of the wideband HF communication channel (step 210). The processor(s) 118 can generate the second data unit to include the SNR value determined (e.g., based on the statistical analysis) to represent the SNR estimate of the wideband HF channel and/or the BER value determined (e.g., based on the statistical analysis) to represent the BER estimate of the wideband HF channel. The processor(s) 118 can cause the transceiver circuit 116 to transmit the second data unit to the first HF communication device 102. The second data unit can be a results protocol PDU including one or more estimated parameters or attributes of the wideband HF channel. The one or more estimated parameters or attributes of the wideband HF channel can be for use by the first HF communication device 102, or the processor(s) 110, to determine a data rate for future data transmission from the first HF communication device 102 to the second HF communication device 104.

The method 200 can include the first HF communication device 102 transmitting a message (or other data unit) to the second HF communication device 104 to acknowledge or confirm receipt of the second data unit including the one or more estimated parameters or attributes of the wideband HF channel (step 210). In some implementations, the first HF communication device 102 can omit sending the acknowledgment message (or data unit) to the second HF communication device 104.

The method 200 can include the first HF communication device 102 determining, using the one or more estimated parameters or attributes of the wideband HF channel, a data rate for future transmission of data to the second HF communication device 104 (step 214). The processor(s) 110 can extract the one or more estimated parameters (e.g., estimated SNR and/or BER) from the second data unit received at step 210. The processor(s) 110 can use the one or more estimated parameters to determine the data rate for use to transmit data to the second HF communication device 104 over the wideband HF channel. For example, the processor(s) 110 can employ the Shannon-Hartley theorem, which assumes an additive white Gaussian noise, to determine or compute the data rate. According to the Shannon-Hartley theorem, the data rate R can be determined as $R = B \log_2(1+S/N)$.

The parameter B represents the bandwidth of the wideband HF channel, and the term S/N represents the estimated SNR of the wideband HF channel.

The method 200 can include the second HF communication device 104 sending the predefined data load to the first HF communication device over a second wideband HF channel (step 216). The second wideband HF channel can be selected by the second HF communication device 104 for future transmission of data to the first HF communication device 102. The predefined data load can be the same as that transmitted by the first HF communication device at step 206. The predefined data load can be transmitted from the second HF communication device 104 to the first HF communication 102 over a configurable time period ranging, for example, between 15 and 60 seconds. Transmission of the predefined data load can be for allowing assessment of characteristics or attributes of the second wideband HF channel. As discussed above with regard to FIG. 1, the first and second HF channels can represent the same frequency channel (e.g., opposite transmission paths of the same frequency channel) or separate frequency channels. Even if the first and second HF channels correspond to (opposite transmission paths of) a single frequency channel, they can have different optimal transmission data rates due to different propagation paths, different transmit/receive antenna characteristics, different background noise at the receiving HF communication device, among other factors.

The method 200 can include the first HF communication device 102, or respective processor(s) 110, determining or estimating one or more parameters of the second wideband HF channel using the predefined data load received from the second HF communication device 104 (step 218). The first HF communication device 102, similar to the second HF communication device 104, can have a modulated version and/or a non-modulated version of the predefined data load stored in the memory 112. The processor(s) 110 can determine the one or more parameters using the received predefined data load and the modulated and/or non-modulated versions of the redefined data load maintained by the first HF communication device 102, as discussed above with regard to step 208. The one or more parameters can include SNR, BER, FIR, and/or other parameters or attributes of the second HF channel. Similar to step 208, the processor(s) 110 can compute or estimate multiple values of the SNR and/or BER, and perform a statistical analysis on the computed or estimated values to determine a final estimate of the SNR and/or BER of the second HF channel.

The method 200 can include the first HF communication device 102, or the respective transceiver circuit 108, sending a third data unit including estimates of the one or more parameters of the second wideband HF channel (step 220). The processor(s) 110 can generate the third data unit and insert the estimates of the one or more parameters therein. The estimates of the one or more parameters included in the third data unit can be for use by the second HF communication device 104 to determine a data rate for future transmission of data to the first HF communication device 102. Similar to the second data unit, the third data unit can be a results PDU.

The method 200 can include the second HF communication device 104 determining, using the estimates of the one or more parameters received in the third data unit, a data rate for use when transmitting data to the first HF communication device 102 over the second wideband HF channel (step 222). The processor(s) 118 can extract the estimates of the one or more parameters from the third data unit, and determine the data rate as discussed above with regard to step 214.

The method 200 can include the second HF communication device 104 transmitting a message (or data unit) to the first HF communication device 102 confirming establishment of a wideband HF link (or connection) for transmitting data over the second wideband HF channel to the first HF communication device 102 (step 224). The second HF communication device 104 can send the message responsive to determining the data rate at step 222. The second HF communication device 104 can transmit data to the first HF communication device 102 according to the data rate determined at step 222.

The method 200 can include the first HF communication device 102 transmitting a message (or data unit) to the second HF communication device 104 confirming establishment of a wideband HF link (or connection) for transmitting data to the second HF communication device 104 (step 226). The message from first HF communication device 102 can be responsive to determining the data rate at step 214. The first HF communication device 102 can transmit data to the second HF communication device 104 according to the data rate determined at step 214.

While the method 200 depicts linking processes for establishing HF links (or connections) in both directions between the first and second HF communication devices 102 and 104, such linking processes can be performed in combination as shown in FIG. 2 or separately. Specifically, the linking process in each direction can be performed separate from the linking process in the other direction.

Figure 3:
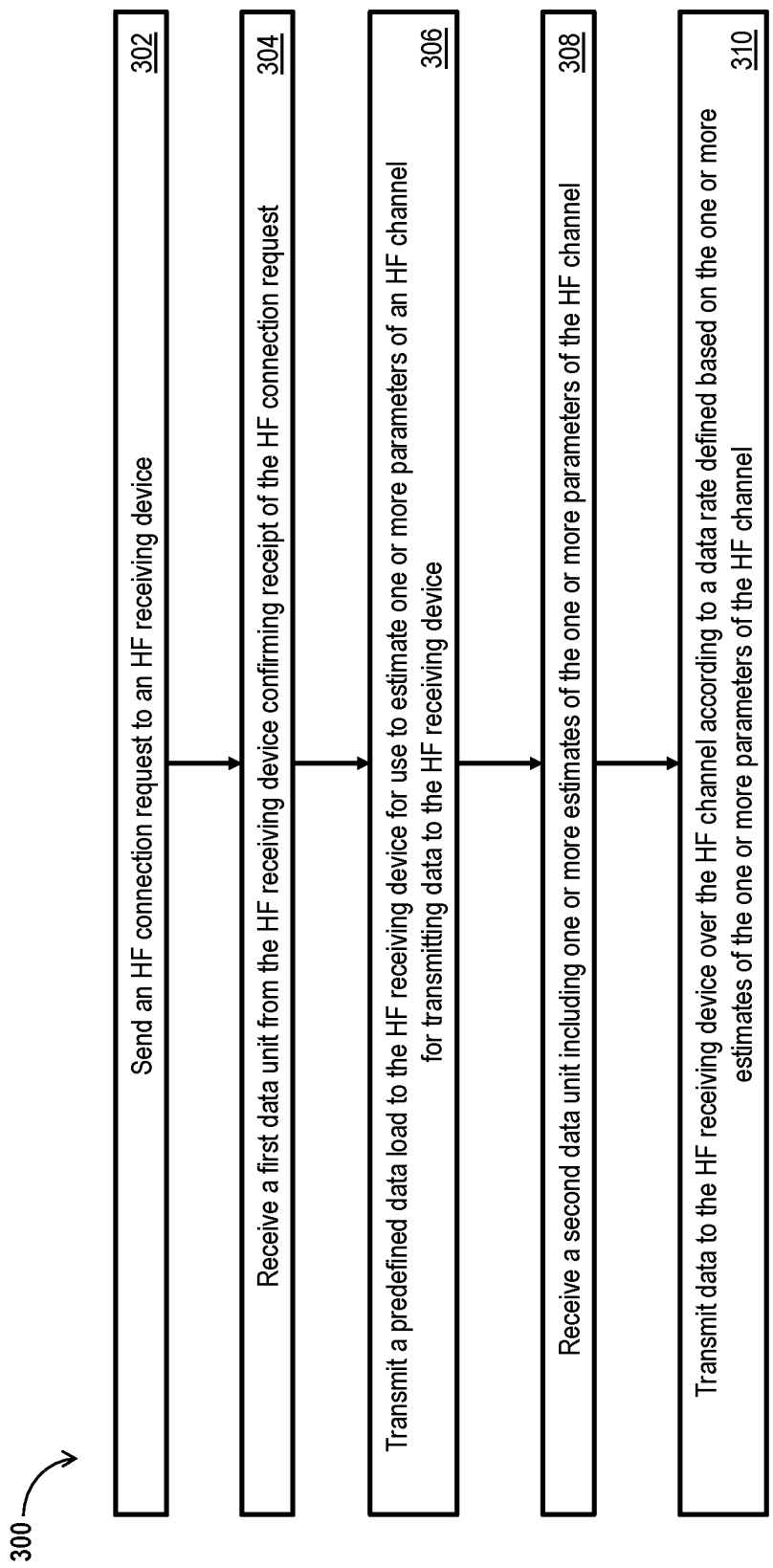
FIG. 3 is a flow diagram of a resilient HF linking method performed by an HF transmitting device, according to some inventive concepts disclosed herein.

Referring to FIG. 3, a flow diagram of a resilient HF linking method 300 performed by an HF transmitting device is shown, according to some inventive concepts disclosed herein. The method 300 can include the HF transmitting device sending an HF connection request to a HF receiving device (step 302). The method 300 can include the HF transmitting device receiving a first data unit from the HF receiving device confirming receipt of the HF connection request (step 304). The method 300 can include the HF transmitting device transmitting, responsive to receiving the first data unit, a predefined data load to the HF receiving device for use to estimate one or more parameters of an HF channel for transmitting data from the HF transmitting device to the HF receiving device (step 306). The method 300 can include the HF transmitting device receiving, from the HF receiving device and responsive to transmitting the predefined data load, a second data unit including one or more estimates of the one or more parameters of the HF communication channel (step 308). The method 300 can include the HF transmitting device transmitting data to the HF receiving device over the HF channel according to a data rate defined based on the one or more estimates of the one or more parameters of the HF channel (step 310).

The method 300 can be viewed as describing acts performed by the first HF communication device 102 (acting as transmitting device) in relation to steps 202-214 and 226 of FIG. 2, or acts performed by the second HF communication device 104 (acting as transmitting device) in relation to steps 216-224 of FIG. 2. Accordingly, the method 300 can include other acts performed by the first HF communication device 102 (acting as transmitting device) in relation to steps 202-214 and 226, other acts performed by the second HF communication device 104 (acting as transmitting device) in relation to steps 216-224, or features described in relation to the FIG. 2.

Figure 4:
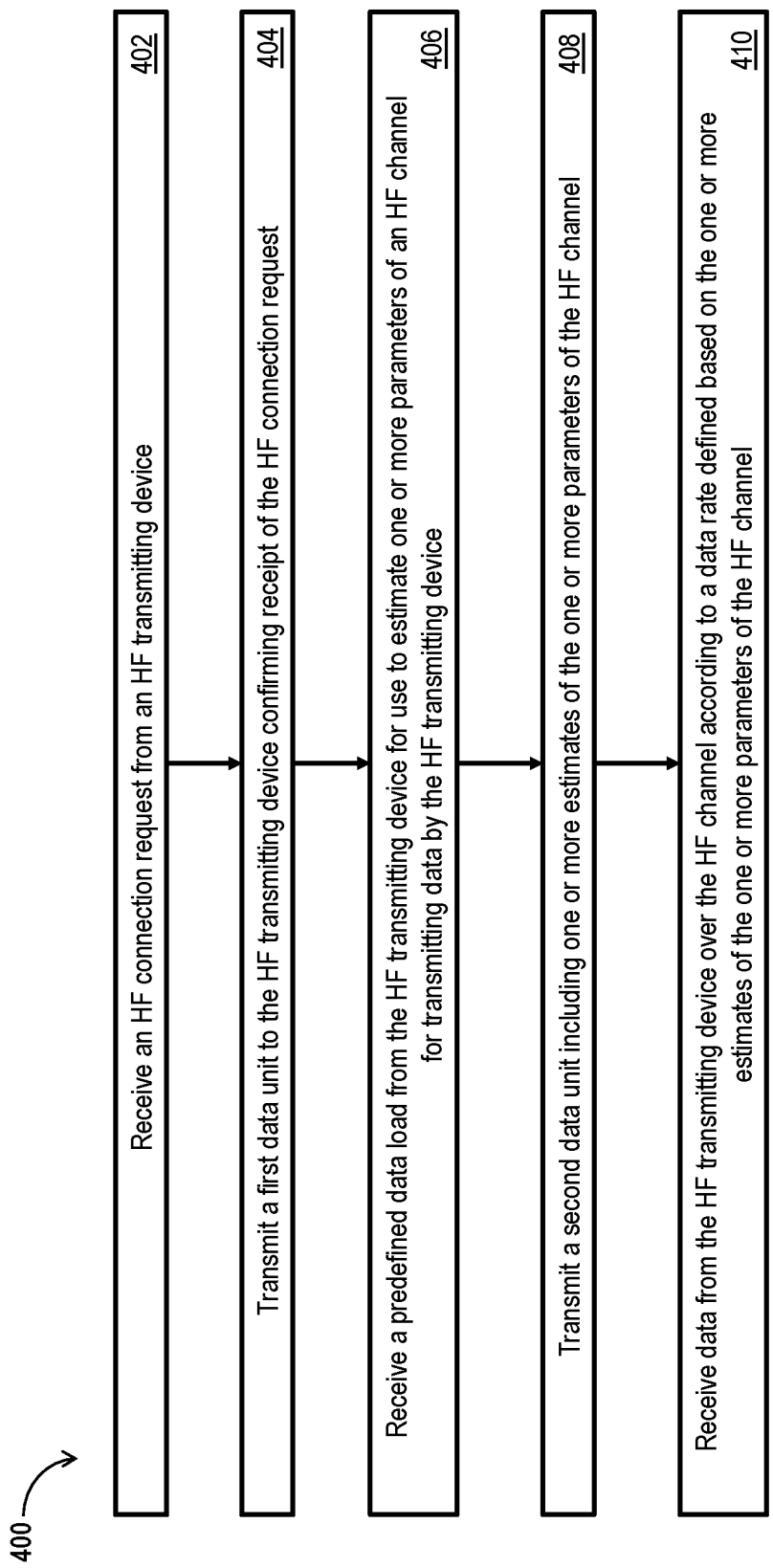
FIG. 4 is a flow diagram of a resilient HF linking method performed by an HF receiving device, according to some inventive concepts disclosed herein.

Referring to FIG. 4, a flow diagram of a resilient HF linking method 400 performed by an HF receiving device is shown, according to some inventive concepts disclosed herein. The method 400 can include the HF receiving device receiving an HF connection request from an HF transmitting device (step 402). The method 400 can include the HF receiving device transmitting a first data unit to the HF transmitting device confirming receipt of the HF connection request (step 404). The method 400 can include the HF receiving device receiving, responsive to the first data unit, a predefined data load from the HF transmitting device for use to estimate one or more parameters of an HF channel for transmitting data from the HF transmitting device to the HF receiving device (step 406). The method 400 can include the HF receiving device transmitting, to the HF transmitting device and responsive to the predefined data load, a second data unit including one or more estimates of the one or more parameters of the HF communication channel (step 408).

The method 400 can include the HF receiving device receiving data from the HF transmitting device over the HF channel according to a data rate defined based on the one or more estimates of the one or more parameters of the HF channel (step 410).

The method 400 can be viewed as describing acts performed by the second HF communication device 104 (acting as the receiving device) in relation to steps 202-214 and 226 of FIG. 2, or acts performed by the first HF communication device 102 (acting as the receiving device) in relation to steps 216-224 of FIG. 2. Accordingly, the method 400 can include other acts performed by the second HF communication device 104 in relation to steps 202-214 and 226, other acts performed by the first HF communication device 102 in relation to steps 216-224, or features described in relation to the FIG. 2.

Over the air (OTA) testing of the linking processes described above in relation to FIGS. 2-4 has been conducted and respective results show significant improvement in the performance (or quality) of established links, compared to links created using existing ALE protocols. The improvements seen during the OTA tests include an improvement in BER by a factor of up to 122, and an average decrease in the BER by a factor of 5.6. In addition, the resilient linking protocol or method(s) described herein vastly improves data synchronization maintenance resulting in a low probability of synchronization loses between the transmitting and receiving devices.

While the resilient HF linking methods are described herein in relation to wideband HF channels, it is to be noted that the same methods can also be applied for narrowband HF channels. Also, the methods described herein can be implemented using software, hardware, firmware, or a combination thereof. For instance, the methods described herein can be implemented using computer program instructions that can be stored in a non-transitory computer-readable medium (e.g., memory or storage device, and executed by one or more hardware processors. The computer program instructions include code from any programing language, such as C, C++, C #, Java, JavaScript, Perl, HTML, XML, Python, Visual Basic, et cetera, or any combination thereof.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A high frequency (HF) communication device, comprising:
   a processor; and
   a memory communicably coupled to the processor storing computer code instructions, the computer code instructions, when executed by the processor, cause the HF communication device to:
      send an HF connection request to a second HF communication device;
      receive, responsive to transmitting the HF connection request, a first data unit from the second HF communication device confirming receipt of the HF connection request by the second HF communication device;
      transmit, responsive to receiving the first data unit, a predefined data load to the second HF communication device for use to estimate one or more parameters of a first wideband HF communication channel for transmitting data from the HF communication device to the second HF communication device, the predefined data load known to the second HF communication device;
      receive, from the second HF communication device and responsive to transmitting the predefined data load, a second data unit including one or more estimates of the one or more parameters of the first wideband HF communication channel; and
      transmit data to the second HF communication device over the first wideband HF communication channel according to a data rate defined based on the one or more estimates of the one or more parameters of the first wideband HF communication channel.

2. The HF communication device of claim 1, wherein the computer code instructions, when executed by the processor, cause the HF communication device to transmit the predefined data load over a time period 15 to 60 seconds long.

3. The HF communication device of claim 1, wherein the one or more parameters include at least one of a signal-to-noise ratio (SNR) or a bit error rate (BER) of the first HF communication channel.

4. The HF communication device of claim 1, wherein the first wideband HF channel has a bandwidth of up to 48 KHz.

5. The HF communication device of claim 1, wherein the computer code instructions, when executed by the processor, further cause the HF communication device to send, responsive to the second data unit, a message to the second HF communication device to confirm receipt of the second data unit.

6. The HF communication device of claim 1, wherein the computer code instructions, when executed by the processor, further cause the HF communication device to:
   receive a second predefined data load from the second HF communication device for use to estimate one or more parameters of a second wideband HF communication channel for transmitting data from the second HF communication device to the HF communication device, the second predefined data load known to the HF communication device;
   determine, based on the second predefined data load, one or more estimates of one or more second parameters of the second wideband HF communication channel; and
   transmit, to the second HF communication device, a third data unit including the one or more estimates of the one or more second parameters of the second wideband HF communication channel.

7. The HF communication device of claim 6, wherein the second predefined data load is received over a time period 15 to 60 seconds long.

8. The HF communication device of claim 6, wherein the one or more second parameters include at least one of a signal-to-noise ratio (SNR) or a bit error rate (BER) of the second HF communication channel.

9. The HF communication device of claim 6, wherein the second wideband HF channel has a bandwidth of up to 48 KHz.

10. The HF communication device of claim 6, wherein the computer code instructions, when executed by the processor, further cause the HF communication device to receive a message from the second HF communication device to confirm establishing a wideband HF connection for transmitting data from the second HF communication device to the HF communication device.

11. The HF communication device of claim 1, wherein the computer code instructions, when executed by the processor, further cause the HF communication device to send a message to the second HF communication device to confirm establishing a wideband HF connection for transmitting data from the HF communication device to the second HF communication device.

12. A method for establishing wideband HF connections, the method comprising:
   sending, by a first HF communication device, an HF connection request to a second HF communication device;
   receiving, by the first HF communication device, responsive to transmitting the HF connection request, a first data unit from the second HF communication device confirming receipt of the HF connection request by the second HF communication device;
   transmitting, by the first HF communication device, responsive to receiving the first data unit, a predefined data load to the second HF communication device for use to estimate one or more parameters of a first wideband HF communication channel for transmitting data from the HF communication device to the second HF communication device, the predefined data load known to the second HF communication device;
   receiving, by the first HF communication device from the second HF communication device, responsive to transmitting the predefined data load, a second data unit including one or more estimates of the one or more parameters of the first wideband HF communication channel; and
   establishing, by the first HF communication device, a first wideband connection with the second HF communication device to transmit data to the second HF communication device over the first wideband HF communication channel according to a data rate defined based on the one or more estimates of the one or more parameters of the first wideband HF communication channel.

13. The method of claim 12, wherein transmitting the predefined data load includes transmitting the predefined data load over a time period 15 to 60 seconds long.

14. The method of claim 12, wherein the one or more parameters include at least one of a signal-to-noise ratio (SNR) or a bit error rate (BER) of the first HF communication channel.

15. The method of claim 12, further comprising:
   receiving, by the first HF communication device, a second predefined data load from the second HF communication device for use to estimate one or more parameters of a second wideband HF communication channel for transmitting data from the second HF communication device to the HF communication device, the second predefined data load known to the HF communication device;

determining, by the first HF communication device and based on the second predefined data load, one or more estimates of one or more second parameters of the second wideband HF communication channel; and transmitting, by the first HF communication device to the second HF communication device, a third data unit including the one or more estimates of the one or more second parameters of the second wideband HF communication channel.

16. The method of claim 15, wherein receiving the second predefined data load includes receiving the second predefined data load over a time period 15 to 60 seconds long.

17. The method of claim 15, wherein the one or more second parameters include at least one of a signal-to-noise ratio (SNR) or a bit error rate (BER) of the second HF communication channel.

18. The method of claim 15, further comprising:

receiving, by the first HF communication device, a message from the second HF communication device to confirm establishing a wideband HF connection for transmitting data from the second HF communication device to the first HF communication device.

19. The method of claim 15, further comprising:

sending, by the first HF communication device, a message to the second HF communication device to confirm establishing a wideband HF connection for transmitting data from the first HF communication device to the second HF communication device.

20. A non-transitory computer-readable medium having computer code instructions stored thereon, the computer code instructions, when executed by a processor, cause an HF communication device to:

send an HF connection request to a second HF communication device;

receive, responsive to transmitting the HF connection request, a first data unit from the second HF communication device confirming receipt of the HF connection request by the second HF communication device;

transmit, responsive to receiving the first data unit, a predefined data load to the second HF communication device for use to estimate one or more parameters of a first wideband HF communication channel for transmitting data from the HF communication device to the second HF communication device, the predefined data load known to the second HF communication device;

receive, from the second HF communication device and responsive to transmitting the predefined data load, a second data unit including one or more estimates of the one or more parameters of the first wideband HF communication channel; and establish a first wideband connection with the second HF communication device to transmit data to the second HF communication device over the first wideband HF communication channel according to a data rate defined based on the one or more estimates of the one or more parameters of the first wideband HF communication channel.

* * * * *